Feb. 14, 1961  D. E. LIPPKE  2,971,386
FLUID PUMP DRIVE AND MOUNTING
Filed Dec. 31, 1956
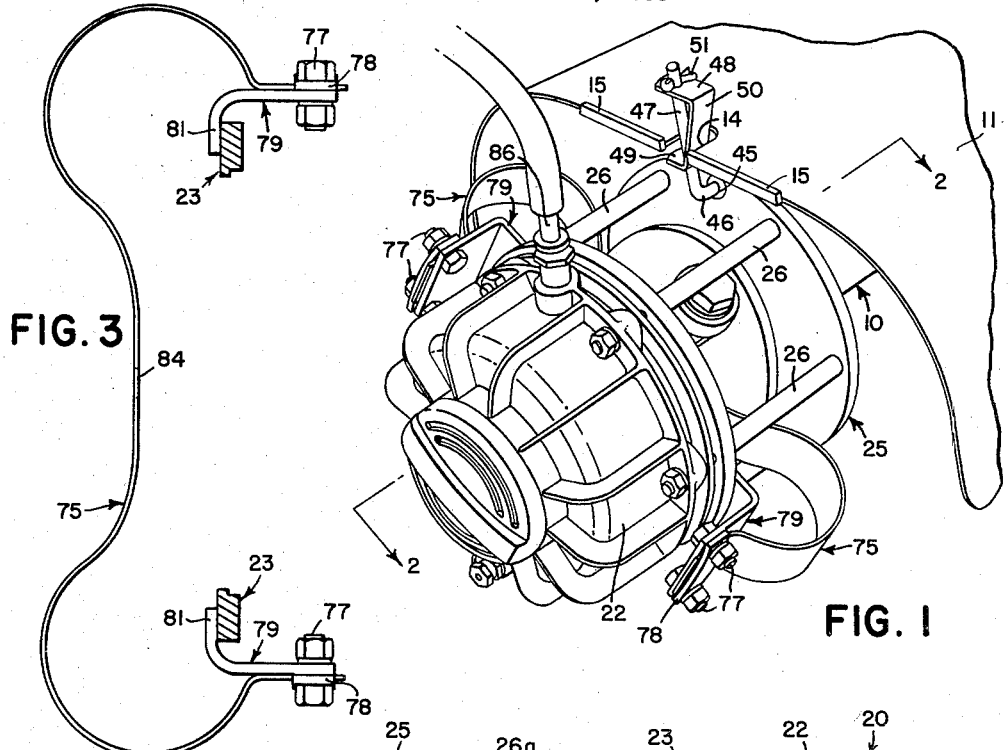
FIG. 3
FIG. 1
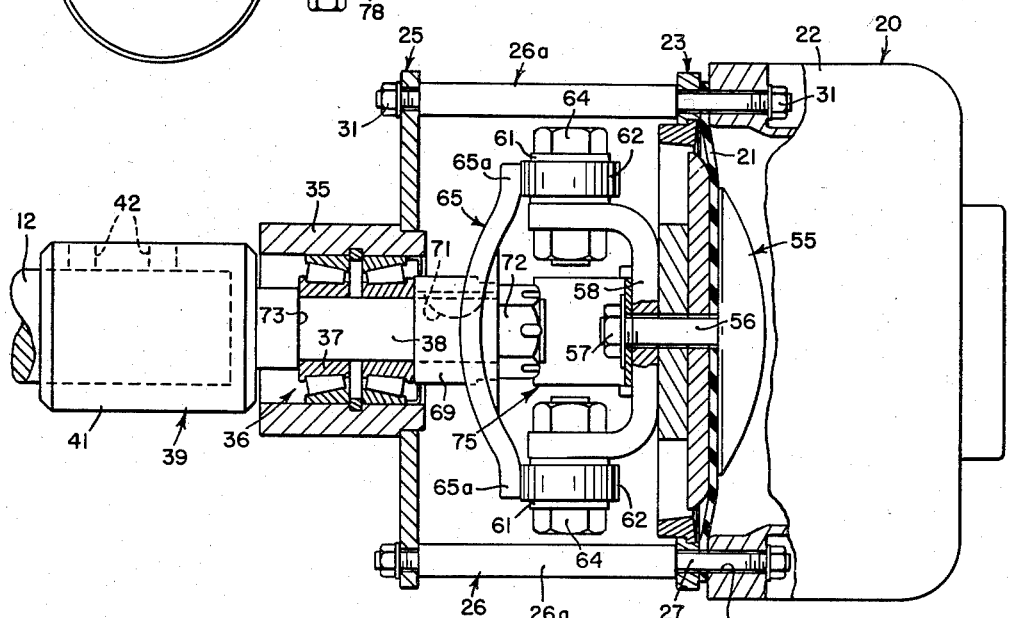
FIG. 2
INVENTOR.
DONALD E. LIPPKE
BY
ATTORNEYS

United States Patent Office 2,971,386
Patented Feb. 14, 1961

2,971,386

FLUID PUMP DRIVE AND MOUNTING

Donald E. Lippke, Moline, Ill., assignor, by mesne assignments, to Deere & Company, a corporation of Delaware Filed Dec. 31, 1956, Ser. No. 631,825

2 Claims. (Cl. 74—55)

The present invention relates generally to agricultural implements and more particularly to tractor carried attachments deriving power for their operation from the power take-off shaft of the tractor.

The object and general nature of the present invention is the provision of new and improved mounting means for a fluid pump for both liquids and gaseous materials, whereby the pump is driven and/or supported in a new and improved manner. Particularly, it is a feature of this invention to provide for driving the pump and also supporting it from the power take-off shaft of the tractor and, further, is readily mounted thereon so as to be supported thereby in such a manner as to readily facilitate the mounting of the unit on the tractor or the disconnection of the unit therefrom. More particularly, it is a feature of this invention to provide means interconnecting the pump support with the power take-off shield so as to hold the pump and its support against rotation with the power take-off shaft.

Another important feature of this invention is the provision of a power take-off shaft mounting for a pump having a part that is adapted to be reciprocated, with cam means on the power take-off shaft connected to reciprocate said part.

A further feature of this invention is the provision of means for driving a pump having a reciprocatory part by cam means two or more strokes for one revolution of the drive shaft. In this connection it is an additional feature to provide for a multi-lobed cam on a driving shaft adapted to actuate a pump having a reciprocatory part in which the direction of reciprocation is generally in alignment with the shaft.

These and other objects and advantages of the present invention will be apparent to those skilled in the art after a consideration of the following detailed description, taken in conjunction with the drawings, in which:

Fig. 1 is a perspective view of a pump and pump mounting arrangement in which the principles of the present invention have been incorporated.

Fig. 2 is a generally central section, taken generally along the line 2—2 of Fig. 1, certain parts being shown in elevation, illustrating the preferred form of drive connection between the power take-off shaft and the driven part of the pump.

Fig. 3 is a fragmentary view showing the spring that is connected to move the reciprocatory part of the pump in one direction.

Referring first to Fig. 1, a farm tractor of generally conventional construction is represented by its power take-off shaft housing 10 and its protective shield 11 that embraces the power take-off shaft housing 10 and the associated power take-off shaft, the rear end of which is shown at 12 in Fig. 2. The shield 11 is provided along its rear edge with the slotted portion 14 which, with the associated lugs 15, is adapted to receive associated shielding for the drive shaft means (not shown) of an associated agricultural implement when the latter is connected with the tractor. The shield notch 14 is utilized in the pump mounting of the present invention, as will be explained below.

The pump that, according to the principles of the present invention, is adapted to be supported on and driven by the power take-off shaft 12 of the tractor is indicated by the reference numeral 20 and represents any suitable form of driven device that is desired to associate with the farm tractor. The pump 20, which is conventional so far as the present invention is concerned, comprises a pump diaphragm 21 closing one end of the pump housing 22. The diaphragm 21 is held in place on the pump housing 22 by means of a head plate assembly 23. A tail plate assembly 25 is fixed in axially spaced apart relation to the pump 20 by means of a plurality of spacer-type fasteners 26, each of which includes a rod 27 reduced and threaded at each end so as to provide end shoulders and an enlarged central section 26a between the head plate 23 and the tail plate 25, as best shown in Fig. 2. The rear ends of the rods 27 extend through openings 29 formed in the adjacent portion of the pump housing 22, and nuts 31 on the ends of the rods hold the plates 23 and 25 in rigid relation with respect to each other and also with respect to the pump housing 22. The central portion of the tail plate 25 is apertured and receives a bearing sleeve 35 that forms a housing for associated bearing means 36. The latter includes an inner race 37 that is mounted on a reduced portion 38 of a shaft extension 39, the forward portion of which is formed as a socket section 41 dimensioned to fit over the outer end of the tractor power take-off shaft 12. Fasteners 42 serve to fix the shaft extension 39 to the power take-off shaft 12 in axial relation. The rigidly interconnected plates 23 and 25, with associated parts, serve as a support adapted to carry the pump 20 on the power take-off shaft of the tractor while the bearing means 36 accommodates rotation of the power take-off shaft 12, together with the shaft extension 39, relative to the unit 20 that normally is held against rotation. The means for accomplishing this result will now be described.

Referring first to Fig. 1, it will be seen that the tail plate 25 is apertured, as at 45, to receive the laterally turned end 46 of a power take-off shield clip rod 47 that extends through openings formed in the end portions of a generally U-shaped power take-off shaft clip 50, the end sections being indicated at 48 and 49, respectively, and the latter being shorter than the end section 48, whereby the power take-off shield clip serves as a wedge type fastener that is disposable within the shield slot 14 and shiftable along the rod 47 to securely wedge the latter and the clip 50 in rigid interconnection with the shield 11 whereby the support means for the pump 20 is held rigidly against rocking or rotary movement. A cotter pin 51 or other suitable means serves to hold the clip 50 in place on the rod 47.

The pump 20 includes a plunger 55 that is connected with the pump diaphragm 21 to operate the latter, the plunger 55 including a stem 56, the outer end of which is threaded to receive a nut 57. A U-shaped drive yoke 58 has its central section apertured to receive the stem 56 and is clamped to the plunger 55 by the nut 57. The end portions of the drive yoke 58 are apertured to receive bearing means 61 on each of which a roller 62 is mounted. The two bearing means 61 are fixed to the yoke 58 by bolt and nut means 64 or other suitable means. Fixed to the outer or rear end of the shaft extension 39 is a drive plate 65 that preferably is in the form of a multi-lobed cam, the rearwardly extended cam sections being indicated at 65a, preferably I provide two pairs of lobes arranged in diametrically opposite relation and spaced so as to engage the cam rollers 62 whereby, for each revolution of the drive plate 65, the plunger 55 is oscillated, thereby providing two strokes of the pump unit 20 for each revolution of the power take-off shaft. It is to be understood, of course, that the pump actuating means may include more than two sets of lobes, producing more than two strokes of the pump per revolution of the shaft, if desired. It is also to be understood that, if desired, the drive yoke 58 or its equivalent may be provided with only one roller 62, in which case the plunger 55 would be provided with any suitable guide means to prevent twisting and/or other displacement of the diaphragm.

The drive plate 65 includes a hub section 69 that is fixed to the rear or outer end of the shaft extension 39 by any suitable means, such as a drive key 71. The outer end of the shaft extension 39 is threaded to receive a nut member 72 that locks the associated parts in interconnected relation, and also holds the inner race 37 of the bearing means 36 against a shoulder 73 that is formed on the shaft extension 39. Where the pump actuating means, such as the drive plate 65, is provided with a considerable number of lobes, the drive member may be operated, where desired, from a part that rotates relatively slowly, such as, for example, one of the drive wheels of a tractor, in which case a more or less conventional pump may readily be operated from a relatively slow moving part without an excessive number of speed increasing gears or other means.

The drive plate or cam member 65 operates positively to force the pump diaphragm 21 inwardly of the housing 22. To positively move the diaphragm 21 in the other direction, I provide a leaf spring member 75 that is formed with arcuate ends, as shown in Fig. 3, which are suitably fixed, as by bolts 77 and clamping strips 78, to the outer portions of a pair of spring mounting brackets 79.

Radially inner ends 81 of the bracket 79 are fixed as by welding to diametrically opposite portion of the head plate 23. The spring is apertured centrally, as indicated at 84, Fig. 3, to receive the outer end of the stem 56, and the spring exerts sufficient bias to move the pump diaphragm 21 outwardly.

The pump 20 delivers fluid, either liquid or gaseous, under pressure through an outlet fitting 86.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. The combination with a tractor having a power take-off shaft, of a shaft extension connected to said shaft and including shaft means having a socket section at one end and a reduced portion at the other end, the socket section being adapted to receive the rear end of the power take-off shaft of the tractor, a device including a movable part adapted to be driven, bearing means on the reduced portion of said shaft and including an inner race fixed to said reduced portion, an outer bearing sleeve, and anti-friction means between said sleeve and said inner race, a tail plate fixed to said sleeve to be supported thereby, a head plate receiving said device, a plurality of peripherally spaced apart elongated members rigidly connecting said head plate to said tail plate in axially spaced apart relation, and connecting means disposed between said head and tail plates and connected with said movable part for driving the latter from the rear end of said shaft means.

2. The invention set forth in claim 1, further characterized by said device comprising an axially reciprocable part, a drive yoke fixed to said part, cam means operated by said shaft means for shifting said drive yoke in one direction, and a leaf spring member fixed at its central portion between said drive yoke and said reciprocable part and having outwardly extending end portions disposed between said peripherally spaced apart elongated members and fixed to said tail plate for urging said reciprocable part in the other direction.

References Cited in the file of this patent
UNITED STATES PATENTS

| | | |
|---|---|---|
| 970,640 | McClintock | Sept. 20, 1910 |
| 1,825,072 | Keller | Sept. 29, 1931 |
| 1,928,082 | Vigne | Sept. 26, 1933 |
| 2,008,475 | Spiller | July 16, 1935 |
| 2,211,741 | Elwell | Aug. 13, 1940 |
| 2,413,775 | Neighbour | Jan. 7, 1947 |
| 2,469,181 | Slater | May 3, 1949 |
| 2,469,277 | Schmidt | May 3, 1949 |
| 2,481,771 | Neild | Sept. 13, 1949 |
| 2,851,896 | Ordway | Sept. 16, 1958 |